US008423662B1

(12) United States Patent
Weihl et al.

(10) Patent No.: US 8,423,662 B1
(45) Date of Patent: Apr. 16, 2013

(54) FORWARD REQUEST QUEUING IN A DISTRIBUTED EDGE PROCESSING ENVIRONMENT

(75) Inventors: William E. Weihl, San Francisco, CA (US); Gene Shekhtman, Cupertino, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 1184 days.

(21) Appl. No.: 10/833,449

(22) Filed: Apr. 28, 2004

Related U.S. Application Data

(60) Provisional application No. 60/465,926, filed on Apr. 28, 2003.

(51) Int. Cl.
*G06F 15/173* (2006.01)
(52) U.S. Cl.
USPC .......................................................... 709/238
(58) Field of Classification Search ................... 709/238
See application file for complete search history.

(56) References Cited

U.S. PATENT DOCUMENTS

| | | | |
|---|---|---|---|
| 5,991,809 A | 11/1999 | Kriegsman et al. | |
| 6,003,030 A | 12/1999 | Kenner et al. | |
| 6,108,703 A | 8/2000 | Leighton et al. | |
| 6,134,596 A * | 10/2000 | Bolosky et al. | 709/233 |
| 6,185,598 B1 | 2/2001 | Farber et al. | |
| 6,279,001 B1 * | 8/2001 | DeBettencourt et al. | 1/1 |
| 6,292,856 B1 * | 9/2001 | Marcotte | 710/39 |
| 6,754,706 B1 | 6/2004 | Swildens et al. | |
| 7,111,057 B1 | 9/2006 | Sherman et al. | |
| 7,130,912 B2 * | 10/2006 | Nishikado et al. | 709/229 |
| 7,181,523 B2 * | 2/2007 | Sim | 709/226 |
| 7,200,681 B1 | 4/2007 | Lewin et al. | |
| 7,240,100 B1 * | 7/2007 | Wein et al. | 709/214 |
| 7,254,634 B1 | 8/2007 | Davis et al. | |
| 7,260,639 B2 | 8/2007 | Afergan et al. | |
| 7,293,093 B2 | 11/2007 | Leighton et al. | |
| 7,376,716 B2 | 5/2008 | Dilley et al. | |
| 7,376,736 B2 | 5/2008 | Sundaram et al. | |
| 2003/0084091 A1 * | 5/2003 | Agarwalla et al. | 709/203 |
| 2003/0135509 A1 * | 7/2003 | Davis et al. | 707/100 |
| 2003/0182261 A1 * | 9/2003 | Patterson | 707/1 |
| 2004/0071085 A1 * | 4/2004 | Shaham et al. | 370/230 |
| 2004/0194095 A1 * | 9/2004 | Lumb et al. | 718/100 |
| 2009/0150518 A1 | 6/2009 | Lewin et al. | |

* cited by examiner

*Primary Examiner* — Krista Zele
*Assistant Examiner* — Esther Benoit
(74) *Attorney, Agent, or Firm* — David H. Judson

(57) ABSTRACT

An edge server in a distributed processing environment includes at least one process that manages incoming client requests and selectively forwards given service requests to other servers in the distributed network. According to the invention, the edge server includes storage (e.g., disk and/or memory) in which at least one forwarding queue is established. The server includes code for aggregating service requests in the forwarding queue and then selectively releasing the service requests, or some of them, to another server. The forward request queuing mechanism preferably is managed by metadata, which, for example, controls how many service requests may be placed in the queue, how long a given service request may remain in the queue, what action to take in response to a client request if the forwarding queue's capacity is reached, and the like. In one embodiment, the server generates an estimate of a current load on an origin server (to which it is sending forwarding requests) and instantiates the forward request queuing when that current load is reached.

15 Claims, 4 Drawing Sheets

FORWARD REQUEST QUEUING IN A DISTRIBUTED EDGE PROCESSING ENVIRONMENT

The application is based on and claims priority from U.S. Provisional Application Ser. No. 60/465,926, filed Apr. 28, 2003.

BACKGROUND OF THE INVENTION

1. Technical Field

The present invention relates generally to execution of Web-based applications in a distributed network of connected machines.

2. Description of the Related Art

Enterprises can expand their business, increase efficiency, and enable new revenue streams by extending their business applications over the Internet to customers, partners, and suppliers. One way to enable enterprises to shift the operational burden of running a reliable and secure Web presence is to outsource that presence, in whole or in part, to a service provider, such as a content delivery network (CDN). A content delivery network is a collection of content servers and associated control mechanisms that offload work from Web site origin servers by delivering content (e.g., Web objects, streaming media, HTML and executable code) on their behalf to end users. Typically, the content servers are located at the "edge" of the Internet. A well-managed CDN achieves this goal by serving some or all of the contents of a site's Web pages, thereby reducing the customer's infrastructure costs while enhancing an end user's browsing experience from the site. In operation, the CDN uses a DNS-based request routing mechanism to locate a CDN edge server electronically close to the client to serve a request directed to the CDN. Sites that use a CDN benefit from the scalability, superior performance, and availability of the CDN service provider's outsourced infrastructure.

Many enterprises, such as those that outsource their content delivery requirements, also implement their business services as multi-tier (n-tier) applications. In a representative n-tiered application, Web-based technologies are used as an outer (a first or "presentation") tier to interface users to the application, and one or more other tiers comprise middleware that provides the core business logic and/or that integrates the application with existing enterprise information systems. The Java 2 Platform, Enterprise Edition (J2EE™) is a technology and an associated component-based model that reduces the cost and complexity of developing such multi-tier, enterprise services. The J2EE runtime environment defines several types of application components that can be used to build services. These include (a) Web tier components (e.g., servlets, JSP pages, Java beans, filters, and web event listeners), which are components that typically execute in a web server and respond to HTTP requests from web clients, and (b) Enterprise tier components (e.g., session beans, entity beans and message driven beans, which may be developed as Enterprise JavaBeans™ (EJB™)), that include the business logic and that execute in a managed environment to support transactions. Runtime support for J2EE application components are provided by so-called "containers," with a Web container supporting the Web tier components, and an Enterprise container supporting the Enterprise tier components. Containers execute the application components and provide utility services. J2EE-compliant servers provide deployment, management and execution support for conforming application components.

The provisioning of server-side Java applications or application components to run on CDN edge servers presents complex deployment and operational issues. A solution is described in commonly-owned, copending application Ser. No. 10/340,206, filed Jan. 10, 2003, titled "Java Application Framework For Use In A Content Delivery Network." According to that application, given edge servers in the CDN are provisioned with application server code used to execute Web tier components of an application (an "edge-enabled application").

SUMMARY OF THE INVENTION

An edge server in a distributed processing environment includes at least one process that manages incoming client requests and selectively forwards given service requests to other servers in the distributed network. According to the invention, the edge server includes storage (e.g., disk and/or memory) in which at least one forwarding queue is established. The server includes code for aggregating service requests in the forwarding queue and then selectively releasing the service requests, or some of them, to another server. The forward request queuing mechanism preferably is managed by metadata, which, for example, controls how many service requests may be placed in the queue, how long a given service request may remain in the queue, what action to take in response to a client request if the forwarding queue's capacity is reached, and the like. In one embodiment, the server generates an estimate of a current load on an origin server (to which it is sending forwarding requests) and instantiates the forward request queuing when that current load is reached.

In one embodiment, the invention is implemented in an edge server that also supports an edge processing application framework to enable an edge-enabled application or application component to respond to an end user request without delay while buffering origin server forward requests.

More generally, it is another object of the invention to enable an edge server to provide a "store and forward" operation with respect to origin server "go forward" requests, as an origin server may not always be available when a particular edge server process needs to communicate with the origin.

The foregoing has outlined some of the more pertinent features of the present invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

The present invention leverages Internet CDN architecture and functionality such as generally described below. Familiarity with Java programming conventions and the J2EE architecture are presumed. Additional information about J2EE is available in the publication titled *Java 2 Platform Enterprise Edition Specification* v1.3 (July 2001), which is available from Sun Microsystems.

By way of background, it is known in the prior art to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a DNS request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
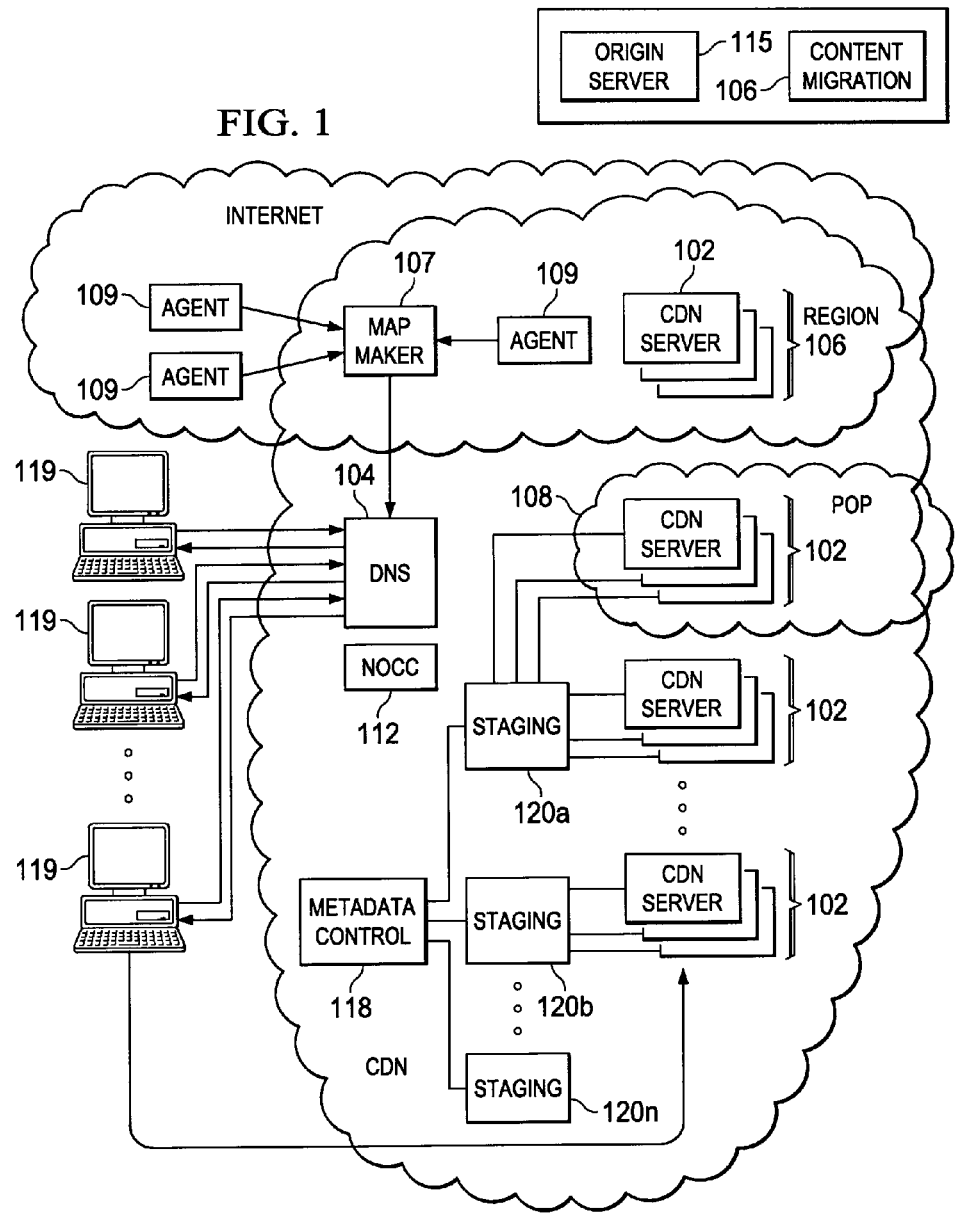
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. The distribution infrastructure consists of on-demand or push-based mechanisms that move content from the origin server to the surrogates. A CDN service provider (CDNSP) may organize sets of surrogate origin servers as a group or cluster, sometimes called a "region." In this type of arrangement, a CDN region 106 typically comprises a set of one or more content servers that share a common back-end network, e.g., a LAN, and that are located at or near an Internet access point. A typical CDN region may be co-located within an Internet Service Provider (ISP) Point of Presence (PoP) 108 or some other data center. A "region" need not be associated with or imply any geographic association. A representative CDN content server is a Pentium-based caching appliance running an operating system (e.g., Linux-based, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. An "edge" server need not be associated with or imply any particular geographic association, however. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. Once an edge server is identified, the browser passes the object request to the server, which applies the metadata supplied from a configuration file or HTTP response headers to determine how the object will be handled.

As also seen in FIG. 1, the CDNSP may operate a metadata transmission system 116 comprising a set of one or more servers to enable metadata to be provided to the CDNSP content servers. The system 116 may comprise at least one control server 118, and one or more staging servers 120a-n, each of which is typically an HTTP server (e.g., Apache). Metadata is provided to the control server 118 by the CDNSP or the content provider (e.g., using a secure extranet application) and periodically delivered to the staging servers 120a-n. The staging servers deliver the metadata to the CDN content servers as necessary. Of course, any other convenient data transport mechanism may be used to deliver the customer metadata to the CDN servers.

Figure 2:
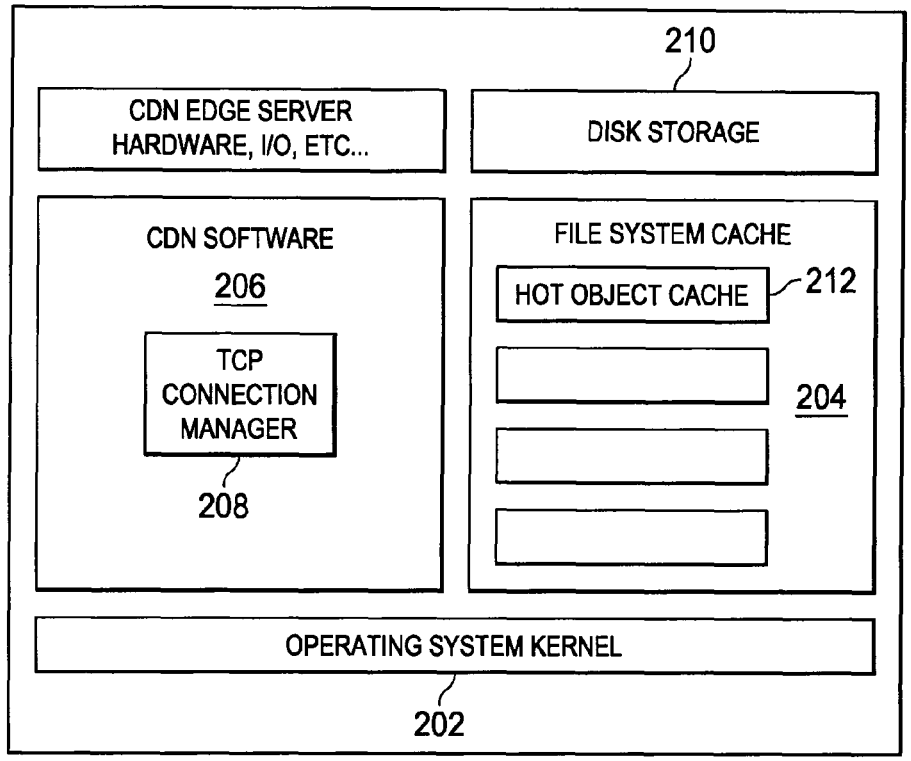
FIG. 2 illustrates a typical machine configuration for an edge server.

FIG. 2 illustrates a typical machine configuration for a CDN edge server. Typically, the content server 200 is a caching appliance running an operating system kernel 202, a file system cache 204, server manager software 206, TCP connection manager 208, and disk storage 210. Server manager software 206, among other things, creates and manages a "hot" object cache 212 for popular objects being served by the CDN. It may also provide other CDN-related functions, such as request routing, in-region load balancing, and the like. In operation as an HTTP cache for example, the content server 200 receives end user requests for content, determines whether the requested object is present in the hot object cache or the disk storage, serves the requested object via HTTP (if it is present) or establishes a connection to another content server or an origin server (through a "go forward" mechanism) to attempt to retrieve the requested object upon a cache miss. Typically, the edge server operates in a "pull" manner, wherein an object is pulled into the cache initially upon the first request to the cache—which will generate a cache miss since the object is not present. This is not required, however, as content may be pushed into the server before it is requested for the first time.

The distributed network may also include an application framework comprising, for example, at least one region of application server-enabled edge servers. In such case, a given edge server (the machine) such as illustrated above in FIG. 2 also includes application server code. As is well-known, an application server is a software platform (sometimes called middleware) on which applications can be deployed. It provides useful utility services and functions to applications. There are currently several major types of application servers, Java-based (J2EE) and Microsoft .NET. Java, of course, is a programming language and a platform, and the programming language is object-oriented and platform independent. Applications written in Java are translated into Java byte code, which code is then run on (intepreted by) a Java Virtual Machine (JVM). In one embodiment, the present invention takes advantage of given edge servers in the CDN that are provisioned with application server and additional code to enable applications or application components to be executed from the edge of the Internet. The framework can take advantage of and leverage the mapping, load-balancing and management systems used with known CDN offerings, such as the CDN illustrated in FIG. 1 (which is merely representative). In a first embodiment, the application server is a servlet container (e.g., Apache Tomcat), to enable offloading and execution of the Web tier of n-tier Java-based applications. JSP, servlets, Java beans and custom tags, which are executed within an application server's servlet container, are executed at the edge of the Internet, close to the end-user. The Web tier is typically the front end of a J2EE server. In an alternate embodiment, in addition to the Web tier, at least some or all of the Enterprise tier of the application is also deployed to and executed on a given edge server. The Enterprise or "business" tier typically hosts application-specific business logic and provides system-level services such as transaction management, concurrency control, and security. Further details of a preferred Java-based application framework are described in copending, commonly-owned Ser. No. 10/304,206, the disclosure of which is incorporated by reference.

Figure 3:
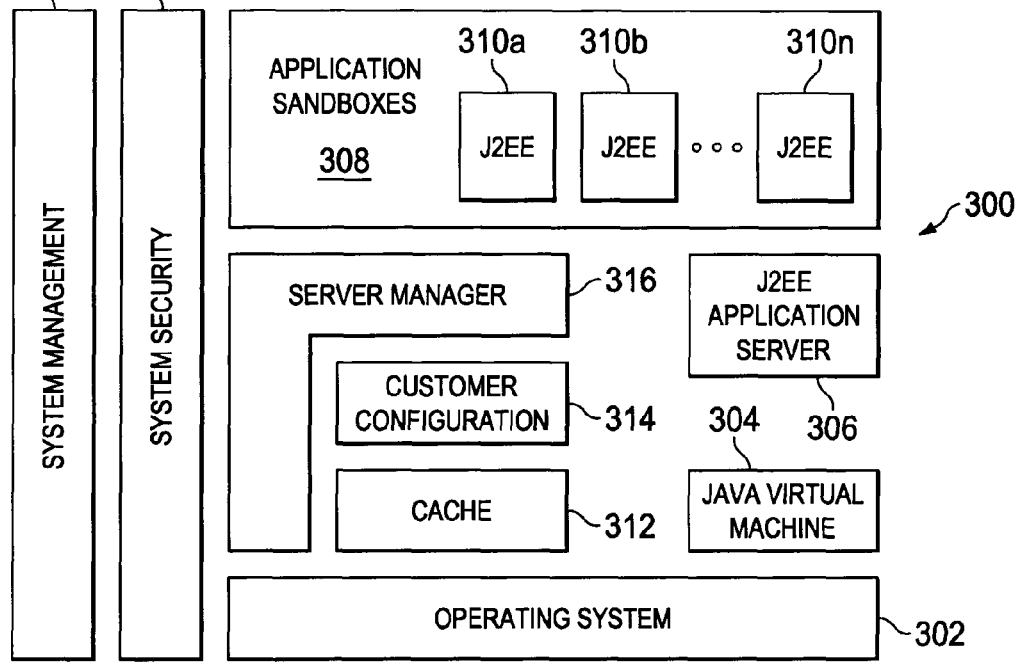
FIG. 3 illustrates a typical machine configuration for an edge server that is provisioned to executed edge-enabled applications or application components.

FIG. 3 illustrates a representative edge server architecture for a CDN server in the edge-enabled application region(s). A given region includes one or more of such servers that are interconnected over a common back-end LAN, as previously described. The server 300 preferably runs on commodity hardware running an operating system (e.g., a modified form of Linux) 302. The Java stack includes a Java Virtual Machine (JVM) 304 and preferably a J2EE-compliant application server 306. For Web tier components, the application server 306 may be implemented with Apache Tomcat servlet container. In particular, a representative Web container is provided by Apache Tomcat servlet container, which uses the JVM in JDK 1.3.1_04 available from Sun Microsystems. Of course, these components are merely exemplary and are not meant to be limiting. For Web tier and Enterprise tier components, the application server 306 may be implemented with IBM WebSphere Application Server (WAS), such as Version 5.0 application server (WAS). IBM WebSphere uses JVM (Java Virtual Machine) 1.3.1. These products, of course, are merely exemplary. The framework (preferably the JVM) creates and maintains application sandboxes 308 for each of the applications 310a-n. A given customer may run application 310a, while another customer runs application 310b. Generalizing, the edge server 300 supports one or more discretely-executable applications. The edge server 300 implements a cache 312 and maintains customer configuration data 314 that controls when application components are used. The server manager 316 overlays and controls the cache, using the customer configuration data. System management 318 and system security 320 modules are also provided to facilitate these and other functions.

Figure 4:
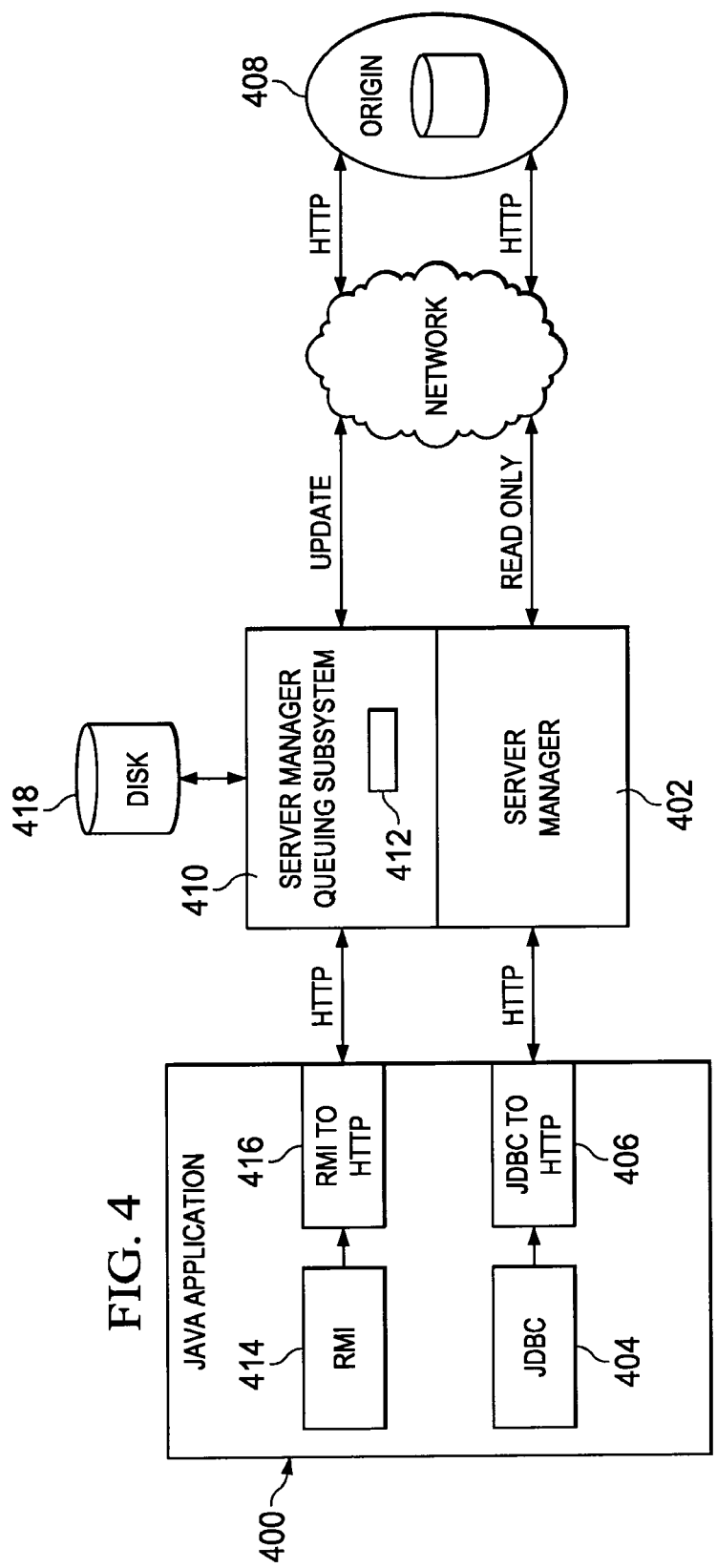
FIG. 4 illustrates how an edge server manager process queues origin server forward requests according to the subject disclosure.
Figure 5:
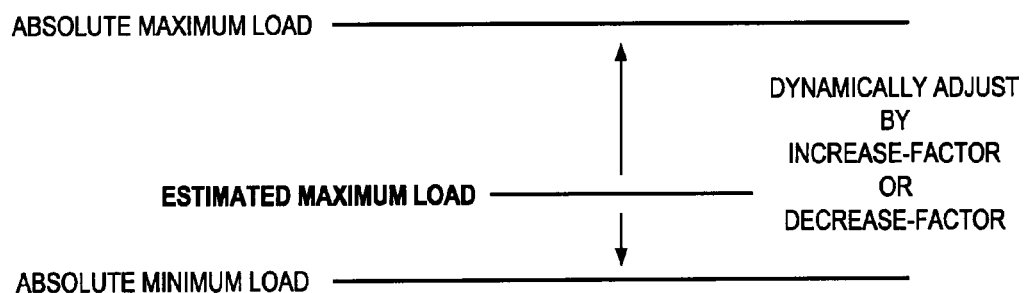
FIG. 5 is a diagram illustrating how load limits for an origin server may be defined and then enforced according to a forward-rate-limiting scheme.

There is a need to reliably queue up processing requests to the origin server for later delivery. In particular, if the origin server is unavailable for some reason, according to the invention, the request is queued by the edge server manager process reliably (preferably on disk) for later delivery. One such solution is illustrated in FIG. 4.

In this example, a Java application 400 (which is merely illustrative) communicates with the edge server manager process 402. In this example, read-only database queries are issued by the Java application 400 using JDBC code 404. As is well known, JDBC technology is an API that enables an application to access a tabular data source (e.g., a spreadsheet, a flat file, or the like) using Java. A JDBC-to-HTTP stub 406 converts these queries to HTTP requests that are then passed to the edge server manager 402. The edge server manager 402 forwards these requests to an origin server 408 and caches the results (this is a standard request path). In this embodiment, the server manager 402 has an associated queuing subsystem 410 having a queue 412. Update queries preferably use Remote Method Invocation (RMI) 414, and these queries preferably are converted to HTTP via an RMI-to-HTTP stub 416. These requests may be reliably queued in queue 412 by the edge server manager's queueing subsystem 410. In an illustrative embodiment, the edge server manager 402 preferably always accept this type of request, persists it to disk 418, and sends an OK reply to the client (i.e., the Java application). Then, the edge server manager 402 attempts to forward the request to the origin server 408. When the origin server 408 confirms successful completion of the request (e.g., by replying with an HTTP OK status), the edge server manager 402 removes the request from its queue 412. If the request fails for any reason, the edge server manager 402 retries the delivery later. Requests generally need to be delivered in-order. The edge server manager 402 preferably queues both GET and POST requests.

The example above is merely illustrative. The technique of queuing requests is not limited to database update requests.

Metadata

A given metadata tag may be used to turn on queuing for specific requests. This metadata may also specify a queue key, if any. For example:

<md name="request-queue-key">string</md> where string is a unique queue identifier. The metadata specifies the queue to which this particular request will be added. Preferably, all requests in this queue will be delivered in-order. In an illustrative case, this metadata is generated dynamically by the Java application if the application has specific transaction knowledge. For example, a given Java application may add the following header to the request:

X-cdnsp-MD-Component: <md name="request-queue-key">user-id=foobar</md> if there should be one queue per user. To specify the reply that the edge server manager process should send to the client (i.e., the Java application) as a confirmation that the request was accepted for delivery, the following metadata may be specified:

<md name="request-queue-reply-arl">arl-string<md> where arl-string is a resource locator of the document that will be served as a reply.

Queue Configuration Metadata

To enable queueing:
<enable-request-queue>on</enable-request-queue>
Queue size limiting metadata:
<md name="request-queue-max-entries">1000</md>

Other metadata limiting queued request size and total queue size may be added. Representative examples are provided below.

Logging and Monitoring

Preferably, the edge server manager process logs records for each successful/failed request delivery attempt. Different codes may be logged to indicate a successful delivery, or failed delivery. This allows the service provider to pull statistics through a distributed query mechanism. Also, aggregate total number of entries in queues may be exposed through the query mechanism.

Further Details

The above-described queuing operation is atypical as compared to the server manager's normal operation, as the request data is saved to disk rather than the response. Under normal conditions, saved requests are delivered and then removed from disk as soon as possible. Ideally, there should be no physical disk I/O—the file is unlinked before dirty buffer cache blocks are flushed to disk. Thus, it may be desirable to synchronize queued requests to disk to provide for queue integrity.

To store requests, preferably the edge server manager maintains a special hash table in memory. Each entry in this table may represent a separate queue and may be keyed by the above "request-queue-key." This table preferably will be "mirrored" to disk, so that the edge server manager process can rebuild it upon startup. The "request-queue-key" may be converted to a fixed length string by using certain number of bits (e.g., 64) of its MD5 signature. This string may be used as a directory name representing a hash table entry. Each file in that directory stores a queued request. The file name will be a request sequence number in the "%08x" format. For example, the 05/AB10FC240010F8/00000002 file will contain the third request in a queue with key "05AB10FC240010F8". If desired, the "request-queue-key" itself may be used as a directory name representing a hash table entry. This puts some limitations on the "request-queue-key" string but guarantees that there will be no collisions.

Upon startup, the edge server process walks the directory structure and rebuilds the hash table in memory. Periodically (e.g., once a day), the edge server manager purges empty directories (table entries) from disk. Each queue (directory) may be limited to a maximum number of entries (and/or bytes). When this limit is exceeded, the server manager sends an error reply to the client (the Java application) instead of an HTTP OK.

The above-described invention may be implemented whether or not a particular application is split into edge side and origin side components. Thus, the inventive technique of queuing requests is not limited to situations where the application has some processing that must be done on the origin server.

One of ordinary skill will recognize that many variants are within the scope of the present invention. The present invention is also extensible beyond Java and J2EE. In particular, the inventive concepts may be practiced in any platform-independent application server programming environment (e.g., Microsoft .NET, Mod Perl executing in Apache, Zope, or the like) capable of being deployed in a distributed computing environment such as a content delivery network.

Variants

There may be other reasons to queue or aggregate information on an edge server in a distributed networking environment to avoid burdening an origin server with requests. For example, it may be desirable to aggregate information about how many times some event happened. The events might be downloads, the serving of a particular piece of content such as an advertisement, or polling data. Aggregating of data within an edge server (or an intermediate server in a caching hierarchy) enables the selective reduction of load on the origin server.

Thus, more generally according to the invention, an edge server (or intermediate server) includes a queuing mechanism that limits origin requests to some maximum rate independent of the rate at which the events occur at the server. As noted above, a preferred way to implement this mechanism is to use control metadata that says, for a particular request, perform aggregation. The metadata also allows the specification of appropriate aggregation limits depending on the particular need. Preferably, the queued information is stored to disk, although this is not a requirement.

Thus, according to this embodiment, aggregation may be carried out as part of an edge server logging mechanism to avoid having the edge server make a request to the origin for every configured event. In an illustrated embodiment, event log lines are collected over a period of time and then transmitted in batch.

The aggregation of origin server-related requests and the associated batch transmission of those requests is quick useful in the application processing environment originally described. In a representative embodiment, end users get mapped to an edge server running the application framework and an application that enables edge processing. A simple example is an order entry form that each user fills in. The present invention enables the application instance to return an immediate response to an end user client while aggregating the data entered by each end user. The aggregated information is then sent in batch to the origin server at some later time. This significant reduces network traffic and reduces the load on the origin server. Requesting end users, however, get instantaneous processing of their requests at the edge servers.

The following provides additional technical details of a representative implementation of the present invention. By way of background, the request queuing mechanism may be implemented in the context of "forward rate limiting" at a given edge server. As used herein, forward rate limiting is used to describe a process by which the edge server is instructed to dynamically adjust the rate at which it sends requests to the origin server. This rate adjustment may be based on an estimated load being sent and a number of failures or slow connections encountered under that load. In the absence of forward rate limiting, the edge server attempts as many connections to the origin server as are needed to satisfy client requests. And, it will forward requests as quickly as possible, without regard to the responsiveness of the origin server. An exception to the default behavior exists when request queuing is used, as this feature preferably places requests in a finite number of queues and delivers them in sequence.

When forward rate limiting is implemented, there may be controls for: assigning load-cost ratings to requests, detecting when an origin is overloaded based on its responsiveness, and queuing requests when the origin server appears to be overloaded. If information about the actual load cost of requests on the origin is available, the feature may be fine-tuned. For example, in a default configuration, all requests are assigned the same load cost, but, if one can identify requests that call CGI scripts or other server programs, one can assign these requests a higher load cost for the edge server to use in calculating the estimated load on the origin. Similarly, one can assign requests to different "pools" and allocate the load among these pools to ensure that a single class of requests doesn't monopolize the origin server, or, that requests that are easy for the origin to handle (for example, serving a small image) are always forwarded without delay.

Technical Details

When forward-rate-limiting is enabled, preferably three load limits are defined for the origin server. These limits apply to the hostname used to go forward. They are:
the absolute maximum load (defaults to a given number)
the estimated maximum load (defaults to a given number)
the minimum load (defaults to a given number, e.g., 1)

These absolute maximum and minimum loads are just numbers. If each request has a load value of the given number (the default setting), each edge server is not permitted to have more than the given maximum number of ongoing requests to the origin server.

The estimated maximum load setting generally controls whether the edge server is permitted to forward a request to the origin server. This setting defaults to the given number only for the purpose of having a value at all when the server first encounters a request for a given hostname or IP address. Once the setting is established it is adjusted dynamically based on results of forward connections, and the calculated value is the only value that is relevant.

Calculating Current Load

The amount of load a given edge server is sending to the origin server is estimated based on the number of requests and the load cost of each request:

estimated load=SUM(request*load-cost)

One can assign load-costs to requests based on any attribute of the request. In a simple case, one could assign a load cost of '2' to requests with the file extension 'asp' or 'cgi' to reflect that these requests consume twice as much resource at the origin as a file extension of 'html' or 'gif' would imply. (Note that this is an arbitrary example not intended to imply that 'asp' or 'cgi' requests necessarily consume twice the resource.)

If the request traffic to the origin server is relatively uniform in composition (i.e., there is always the same percentage of requests that require back-end processing, that fetch large files, and that fetch small files, etc.), then the need to assign request loads to reflect the cost of the different requests is not very significant. However, if the composition of the request traffic varies significantly (e.g., at a particular time of day there is a surge in requests that require back-end processing or otherwise slow down the origin server), then the estimated maximum load might fluctuate considerably as the edge server inadvertently overloads the origin and must reduce the estimated maximum load setting to compensate.

Dynamic Adjustment of Estimated Maximum Load

To effectively adjust the maximum amount of load that an individual server sends forward to the origin, preferably the server tracks how responsive the origin server is in handling:
connections (both TCP and SSL)
read operations
write operations (if configured for use in adjustment, not by default)

If the current load is equal to the estimated-maximum-load, and the edge server encounters a series of consecutive successful I/O operations, it will increase the estimated-maximum-load by a given selectable percentage.

If any of these I/O operations fails, times out, or is slow (takes longer than expected), the count for number of failures, timeouts, or slow responses is incremented. If enough consecutive negative events occur, then the estimated-maximum-load is reduced by a set percent of the current load.

These I/O statistics and the estimated-maximum-load are adjusted on completion of each I/O operation.

Calibrating "Slowness"

As explained above, the rate of requests to the origin preferably is adjusted for failures, timeouts and slowness in responses. A response is considered "slow" if it took longer than expected. When this feature is configured, one should assign appropriate values by which slowness is judged for:
connections (TCP and SSL)
read operations
write operations (if used for adjustment of forward rate)

There may be default settings for each of these, but the default values may not be appropriate for all requests. Particularly in the case of 'read' operations, one should adjust the setting based on the true responsiveness of the origin server. Requests that require back-end processing (for example, CGI scripts) should be given more time before they are determined to be slow.

Processing a Request

As the edge server receives a request it steps through a sequence of checks and calculations to determine how to handle this request given the presence of rate-limiting settings. A representative request flow proceeds like this:

1. Determine if the request should be sent to a queue rather than sent forward. A request will be queued if:
   there are already requests in a queue for this hostname (or for this request pool if the traffic is segregated into pools)
   the maximum allowed concurrent connection attempts to the origin server has already been reached
   the overall-load-cost for this IP is above the estimated maximum load
   the percent of load in this request pool is above the pool-allowed-load.
2. If the request can go forward to the origin server, the server adds the request-load-cost to both IP-load-cost and to the pool-load-cost. This reflects the cost of this request in those totals.
   When the request completes, the request-load-cost is subtracted from both IP-load cost and pool-load cost.
3. When a request is sent to the queue, it will be inserted in the queue based on its priority and arrival time. Under some circumstances, the request may not be added to the queue or may be evicted. This can happen if:
   The queue is full and this request would have been added to the end of the queue.
   The request was already in the queue and has spent too much time there (queue-max-wait-ms).
4. Each time an IP is released or an I/O operation completes, the server will process the queue. First, it checks whether the current load is below the maximum estimated load to determine whether it can release a request from the queue. Then it iterates through the waiting requests to find the first one that can be sent forward. (If request-pools are used, the server checks that the pool-allowed-load for the request has not been exceeded before releasing it from the queue.)

Handling Blocked Requests

If a request is blocked from going forward to the origin server due to forward rate limiting, one can handle the request with a fail-action (e.g., a custom error page or default content). Preferably, there is a special match condition to detect requests that have been blocked due to forward rate limiting.

Enabling Forward Rate Limiting

Forward rate limiting may be enabled through a metadata tag fwd-rate-limit. Other tags related to the feature have default values that will be used when this tag is set to 'on'.

<md name="fwd-rate-limit">on|off|accounting-only</md>

This tag controls whether the edge server manager process will apply rate limiting to the current request. If fwd-rate-limit is turned on for a customer anywhere in metadata, it is preferably best not to turn it off elsewhere for the same origin server. Instead, use the 'accounting-only' setting.

The 'accounting-only' option means that rate limiting is not used but the I/O successes or failures generated by the current request are accounted for, so that the results can be used to more accurately calculate the origin load. To guarantee that a request is forwarded without being held in queue, the 'accounting-only' option should be used.

Setting Limits on Forward Connections

A maximum number of concurrent forward TCP & SSL connects to an origin server IP address may be configured. A default setting may be established and a setting of zero (0) means that the number is unlimited.

<md name="fwd-rate-limit-max-concurrent-connects">number</md>

When the edge server has this many on-going TCP/SSL connect attempts to an origin server IP, any additional requests may be placed in the forward queue.

Note the important difference between a connect attempt and a connection: once the connection is established, that attempt is subtracted from the "ongoing connect attempts." The edge server uses it and will establish more connections as it receives more requests. It is up to the origin to say "no" to new connections. This metadata does not limit the number of concurrent connections, it limits the number of ongoing connection attempts (connects).

With this metadata set to a given default, a single edge server can send only that number of SYN packets out concurrently to the given host to establish connections. Once a connection is established (and potentially becomes a persistent connection), preferably there is room for the server to send another SYN to open a new connection.

Setting Limits on Load to Origin

The following metadata tags may be used for setting limits on the load an individual edge server will place on the origin server. The upper and lower bounds for the load on the origin may be set, and the edge server will adjust the amount of actual load it places on the origin within these limits.

Minimum Load

This tag is associated with a minimum amount of concurrent load that each edge server manager process should send to the origin server. The default is 1.

<md name="fwd-rate-limit-min-load">number</md>

Estimated Maximum Load

This tag is associated with an initial load each edge server manager is allowed to put on the origin server.

<md name="fwd-rate-limit-estimated-max-load">1-number</md>

This value preferably will be dynamically calculated after the edge server has enough I/O feedback based on its communication with the origin. A default setting may be used. The value of this metadata tag preferably is used only when the edge server loads it on first use of an origin server IP address. The metadata tag is ignored from that point on, even if its value changes in metadata.

Absolute Maximum Load

This tag is associated with a maximum load each edge server is allowed to put on the origin server. The default is a given value.

<md name="fwd-rate-limit-max-load">1-number</md>

Partitioning the Load Among Request Types

The total load on the origin server can be partitioned among the various types of requests, e.g., by assigning them to load pools. For example, one may want no more than a certain percentage of the maximum load to hit certain parts of an origin server (cgi-programs, HTML files, images, very large files, etc). In this case, a portion of the load can be assigned to each of these types of requests.

Assigning Requests to Load Pools

A request may be assigned to a particular pool by applying the following metadata tag:

<md name="fwd-rate-limit-pool">0-3</md>

In this example, the value of the tag represents the load pool (0-3) to which the request is assigned.

Allotting Load Among Pools

By setting the following metadata for each load pool, a particular class of requests can be prevented from monopolizing the origin server.

<md name="fwd-rate-limit-pool-allowed-load">0-100%</md>

The value of the tag represents the maximum percentage of load that requests in this pool are allowed to send to the origin server. A default is 100%.

Assigning Load Cost to Requests

The edge server may calculate the amount of load it is placing on the origin server by summing the load of the individual requests it sends forward. By default, all requests may be considered to have a load cost of one (1). A higher load cost can be assigned to requests to more accurately reflect their true processing cost on the origin. For example, requests to CGI programs have a higher true load cost.

<md name="fwd-rate-limit-load-cost">1-number</md>

Assigning Queue Priority to Requests

When the rate of incoming client requests exceeds the limits placed on forwarding requests to the origin server, requests may be placed in a queue to wait for forwarding. This queuing may then continue as long as the imbalance between origin capacity and client requests persists.

A queue priority can be assigned to give some requests a more favorable position in the queue. The lower the queue-priority setting, the more favorable a place the request receives.

A useful default may be established, together with a range of potential values, e.g., 0-20.

When two requests have the same priority, preferably the one received first (that is, whose request headers were parsed earlier) receives the more favorable position. That is, time of receipt preferably determines order in the absence of other priorities.

<md name="fwd-rate-limit-queue-priority">0-20</md>

Queuing Forward Requests

By default, forward rate limiting is configured to place a maximum of a given number of requests in the forward queue when the requests cannot be immediately forwarded to the origin. The maximum number can be changed with the following metadata tag:

<md name="fwd-rate-limit-queue-max-requests">0-up to given number </md>:

When the queue is full, further requests preferably are rejected with an HTTP 503 status code. These rejected requests can be handled with a fail action (serving default content, a default page, or the like) if desired.

When a new request is inserted in the queue, the edge server preferably iterates over all the items in the queue to find the appropriate location for the request based on the request's queue-priority and arrival time.

A metadata tag may be used to elect that no requests are queued. In this case, if a request cannot be immediately forwarded to the origin, it will be rejected.

Forwarding Requests from the Queue

Once requests have been placed in the queue, preferably there is a limit imposed on how many can be released from the queue at one time.

<md name="fwd-rate-limit-queue-max-reguests-allowed-out">0-1000</md>

A default setting may be selected. Zero (0) means that there is no limit.

Maximum Time In Queue

The amount of time that a request may spend in the forward queue before it is rejected may be selected. Preferably, this is a cumulative maximum wait time. That is, it does not refer to each forward connection attempt separately. This time is in milliseconds, and a default may be selected.

<md name="fwd-rate-limit-queue-max-wait-ms">0-600000</md>

If the request is rejected, it can be handled with fail action, as previously described.

Detecting Origin Unresponsiveness

To effectively adjust the maximum amount of load that an individual server sends forward to the origin, the server preferably tracks how responsive the origin server is in handling:

connections (both TCP and SSL)
read operations
write operations

If any of these operations fails, times out, or is slow (takes longer than expected as specified by the tags below), the count for number of failures, timeouts or slow responses is incremented.

Slow TCP Connection

This metadata sets the time in milliseconds before a TCP connection attempt is considered slow. A default may be used.

<md name="fwd-rate-limit-slow-tcp-connect-ms">time in ms</md>

A setting of zero means that no TCP connections will be considered slow no matter how long they may take.

Slow SSL Connection

This metadata sets the time in milliseconds before an SSL connection attempt is considered slow. A default may be used.

<md name="fwd-rate-limit-slow-ssl-connect-ms">time in ms</md>

A zero setting means that no SSL connections will be considered slow no matter how long they may take.

Slow Read Operation

This metadata sets the time in milliseconds before a forward read is considered slow. A default may be used.

<md name="fwd-rate-limit-slow-read-ms">time in ms</md>:

A zero setting means that no reads will be considered slow no matter how long they may take.

Slow Write Operation

This metadata sets the time in milliseconds before a forward write is considered slow. A default may be used.

<md name="fwd-rate-limit-slow-write-ms">time in ms</md>

A zero setting means that no writes will be considered slow no matter how long they may take.

Dynamically Adjusting the Load

The edge server may dynamically adjust the load on the origin server based on I/O successes and failures. The following set of tags specify:

whether a particular I/O operation should be considered for adjusting origin load
how many consecutive successes are required before the load is increased
the amount by which load should be increased
how many consecutive failures are required before the load is decreased
the amount by which load should be decreased Choosing Inputs The following four metadata tags set whether the results of an I/O operation should be ignored for adjusting the load on the origin server. They may have default settings:

<md name="fwd-rate-limit-ignore-tcp-connect-results">off</md>
<md name="fwd-rate-limit-ignore-ssl-connect-results">off</md>
<md name="fwd-rate-limit-ignore-read-results">off</md>
<md name="fwd-rate-limit-ignore-write-results">on</md>

Load Increase for Success

The gradual increase in load can be controlled by specifying:

the number of consecutive I/O successes that must occur to trigger an increase
the percent by which the estimated maximum load should increase.

To specify the number of consecutive successes needed to increase the load, the following tag can be set:

<md name="fwd-rate-limit-load-increase-after-successes">number</md>

After each successful TCP/SSL connect, read, and write, (that does not trigger a slowness threshold) the edge server preferably will check the counter to see if this threshold has been reached the load is increased. A default setting may be used.

When the tag is set to 0, the edge server will not increase the origin's load based on success of the given request.

To specify the amount by which load should be increased on success, the following tag may be set:

```
<md    name="fwd-rate-limit-load-increase-factor-on-
    success">%</md>
```
When the current load on the origin server reaches fwd-rate-limit-estimated-max-load, its load will be increased by this percent as long as the origin's response times are not slow. A default value may be used

```
max-est-load=current-load+this-percent-of-current-
    load
```

Load Decrease for I/O Problems (Failure, Timeout, or Slowness)

The gradual decrease in load can be controlled by specifying:
the number of consecutive I/O problems (failure, timeout, slowness) that must occur to trigger an decrease
the percent by which the estimated maximum load should decrease for each different I/O problem.

Adjusting for Request Timeout

To specify the number of consecutive timeouts needed to decrease the load, the following tag may be set:
```
<md         name="fwd-rate-limit-load-decrease-after-
    timeouts">number</md>
```
The edge server must encounter this many consecutive timed-out I/O operations with the origin for fwd-rate-limit-load-decrease-factor-on-timeout to take effect. A default value may be set.

When set to 0, the origin's load will not be decreased due to timeouts.

To specify the amount by which load should be decreased on I/O timeouts, the following tag can be set:
```
<md name="fwd-rate-limit-load-decrease-factor-on-timeout">0-100%</md>
```
When I/O operations timeout to the origin server, its fwd-rate-limit-estimated-max-load will be set to the current load and decreased by this percent. A default value may be used.

Adjusting for Request Failure

To specify the number of consecutive failures needed to decrease the load, the following tag may be set:
```
<md         name="fwd-rate-limit-load-decrease-after-
    failures>number</md>:
```
The edge server must encounter this many consecutive failed I/O operations with the origin for fwd-rate-limit-load-decrease-factor-on-failure to take effect. A default setting may be used.

When set to 0, the origin's load will not be decreased due to I/O errors.

To specify the amount by which load should be decreased on I/O failure, the following tag may be set:
```
<md    name="fwd-rate-limit-load-decrease-factor-on-
    failure">0-100%</md>:
```
When enough I/O operations to the origin server fail, the estimated maximum load will be set to the current load and decreased by this percent. A default value may be set.

Adjusting for I/O Slowness

To specify the number of consecutive slow I/O operations needed to decrease the load, the following tag may be set:
```
<md         name="fwd-rate-limit-load-decrease-after-
    slowness">number</md>:
```
The edge server must encounter this many consecutive slow I/O operations with the origin for fwd-rate-limit-load-decrease-factor-on-slowness to take effect. A default value may be used.

When set to 0, the origin's load will not be adjusted due to slow I/O operations.

To specify the amount by which load should be decreased on I/O slowness, the following tag may be used:
```
<md    name="fwd-rate-limit-load-decrease-factor-on-
    slowness">0-100%</md>:
```
When I/O operations become slow to the origin server, its fwd-rate-limit-estimated-max-load will be set to the current load and decreased by this percent. A default value may be used.

Adjusting for Sum of all I/O Problems (Failure, Timeout, Slowness)

To specify the number of consecutive I/O problems needed to decrease the load, the following tag may be set:
```
<md            name="fwd-rate-limit-load-decrease-after-
    tfs">number</md>:
```
The edge server must encounter this many consecutive timed-out, failed, and/or slow I/O operations with the origin for fwd-rate-limit-load-decrease-factor-on-tfs to kick in. A default value may be set.

When set to 0, the origin's load will not be adjusted due to a combination of these errors.

To specify the amount by which load should be decreased on the sum of all I/O problems, the following tag may be set:
```
<md         name="fwd-rate-limit-load-decrease-factor-on-
    tfs">0-100%</md>:
```
When I/O operations timeout, fail, or become slow to the origin server, its fwd-rate-limit-estimated-max-load will be set to the current load and decreased by this percent. A default value may be set.

Handling Blocked Requests

The edge server can match on requests that are blocked due to forward rate limiting.
```
<match          type="fwd-rate-limit-blocked-request"
    value="on/off">
```
This will allow the server to apply a fail-action to the request.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described our invention, what we claim is set forth below.

The invention claimed is:

1. Apparatus for use in a distributed network, comprising:
at least one processor, an operating system, and a process executed by the processor that manages incoming client requests and selectively forwards given service requests to at least one other server in the distributed network;
storage coupled to the processor and including at least one queue; and
code tangibly embodied on computer media and executed by the processor for performing the following operations:
aggregating service requests in the queue for subsequent delivery to the at least one other server and dynamically adjusting a rate at which the process forwards service requests to the at least one other server based on an estimated load being sent to the at least one other server by the process;

wherein the estimated load is calculated by:
partitioning the estimated load among two or more service request types, wherein a service request type is defined by a particular file extension;
assigning different load cost weight values to at least first and second service request types;
calculating a load cost of each service request using the load cost weight value associated with the service request type; and
summing the load costs;
wherein the code adjusts the estimated load and thus the rate at which the process forwards the service requests to reflect the cost on the other server of processing service requests associated with the two or more service request types.

2. The apparatus as described in claim 1, wherein the code for aggregating is controlled by metadata.

3. The apparatus as described in claim 2, wherein the metadata identifies a maximum number of service requests that may be aggregated in the queue.

4. The apparatus as described in claim 2, wherein the metadata identifies a maximum time that a given service request may remain in the queue.

5. The apparatus as described in claim 2, wherein the metadata identifies a number of given service requests that may be released from the queue at a given time.

6. The apparatus as described in claim 2, wherein the code aggregates in the queue one or more service requests when a rate of incoming client requests to the process exceeds a limit.

7. The apparatus as described in claim 6, wherein the limit is set by metadata.

8. The apparatus as described in claim 6, wherein the limit is a maximum number of service requests that can be forwarded to the given other server at a given time.

9. The apparatus as described in claim 1, further including code responsive to a determination that a maximum number of service requests are in the queue for taking a given action.

10. The apparatus as described in claim 1, wherein the given action is issuing an error code in response to a given client request being handled by the process.

11. The apparatus as described in claim 1, wherein the given action is issuing given content in response to a given client request being handled by the process.

12. The apparatus as described in claim 1, further including code executed by the processor for determining the estimated load.

13. The apparatus as described in claim 1, further including an edge-enabled application, and wherein the incoming client requests are directed to the edge-enabled application.

14. The apparatus as described in claim 1 wherein the estimated load being sent being sent by the process is based on a number of service requests being sent and a load cost associated with at least one service request.

15. The apparatus as described in claim 1 wherein the code adjusts the estimated load and thus the rate at which the process forwards the service requests by a number of failures or slow connections encountered by the process under a current estimated load.

* * * * *